(12) United States Patent
Brands et al.

(10) Patent No.: US 10,053,048 B2
(45) Date of Patent: Aug. 21, 2018

(54) AIRBAG UNIT AND MOTOR VEHICLE

(71) Applicants: Autoliv Development AB, Vårgårda (SE); Audi AG, Ingolstadt (DE)

(72) Inventors: Stefan Brands, Aichach (DE); Joachim Huber, Kirchdorf (DE); Carsten Klinkert, Hitzhofen (DE); Carlo Heller, Bad Friedrichshall (DE); Kamilla Kreft-Lazarska, Dachau (DE); Helmut Schwaiger, Freising (DE)

(73) Assignees: AUTOLIV DEVELOPMENT AB, Vargarda (SE); AUDI AG, Ingolstadt (DE)

( * ) Notice: Subject to any disclaimer, the term of this patent is extended or adjusted under 35 U.S.C. 154(b) by 0 days.

(21) Appl. No.: 15/109,359

(22) PCT Filed: Feb. 3, 2015

(86) PCT No.: PCT/EP2015/000212
§ 371 (c)(1),
(2) Date: Jun. 30, 2016

(87) PCT Pub. No.: WO2015/117751
PCT Pub. Date: Aug. 13, 2015

(65) Prior Publication Data
US 2016/0325704 A1    Nov. 10, 2016

(30) Foreign Application Priority Data
Feb. 6, 2014   (EP) ..................................... 14000435

(51) Int. Cl.
*B60R 21/231*    (2011.01)
*B62D 9/00*    (2006.01)
(Continued)

(52) U.S. Cl.
CPC ........ *B60R 21/23184* (2013.01); *B60G 7/001* (2013.01); *B60R 21/20* (2013.01);
(Continued)

(58) Field of Classification Search
CPC .... B60R 21/23184; B60R 2021/23308; B60R 21/36; B60R 21/20; B60R 21/26;
(Continued)

(56) References Cited

U.S. PATENT DOCUMENTS 3,792,873 A * 2/1974 Buchner ................ B60R 21/23
  139/389
3,841,654 A * 10/1974 Lewis .................... B60R 21/18
  280/733

(Continued)

FOREIGN PATENT DOCUMENTS

DE       101 54 026 A1    5/2003
DE    10 2011 122 464 A1    6/2013
(Continued)

OTHER PUBLICATIONS

Japanese Office Action dated Jan. 10, 2017—JP2016-519331—with trans.
(Continued)

*Primary Examiner* — Paul N Dickson
*Assistant Examiner* — Timothy Wilhelm
(74) *Attorney, Agent, or Firm* — Brinks Gilson & Lione

(57) ABSTRACT

An airbag unit having an airbag and at least one inflator. The airbag unit is especially suitable for preventing an element located outside the passenger compartment of a vehicle from intruding into the passenger compartment during an accident. The airbag is made of a hose formed of a one-pieced woven element extending from a first end to a second end. The hose is bent or folded, such that two parallel sections (24a, 24b) of the airbag are formed with each section (24a,
(Continued)

24b) enclosing a chamber. The airbag is very robust and can be designed such that in its deployed state its thickness is large in relation to its volume.

13 Claims, 3 Drawing Sheets

(51) Int. Cl.
| | |
|---|---|
| *B60G 7/00* | (2006.01) |
| *B60R 21/20* | (2011.01) |
| *B60R 21/207* | (2006.01) |
| *B60R 21/233* | (2006.01) |
| *B60R 21/2334* | (2011.01) |
| *B60R 21/235* | (2006.01) |
| *B60R 21/237* | (2006.01) |
| *B60R 21/26* | (2011.01) |
| *B60R 21/00* | (2006.01) |

(52) U.S. Cl.
CPC .......... *B60R 21/207* (2013.01); *B60R 21/233* (2013.01); *B60R 21/235* (2013.01); *B60R 21/237* (2013.01); *B60R 21/2334* (2013.01); *B60R 21/26* (2013.01); *B62D 9/00* (2013.01); *B60G 2206/016* (2013.01); *B60R 2021/003* (2013.01); *B60R 2021/23308* (2013.01); *B60R 2021/23514* (2013.01)

(58) Field of Classification Search
CPC . B60R 21/233; B60R 21/2334; B60R 21/235; B60R 21/207; B60R 21/237; B60R 2021/003; B60R 2021/23514; B60G 7/001; B60G 2206/016; B62D 9/00
See application file for complete search history.

(56) References Cited

U.S. PATENT DOCUMENTS

| | | | | |
|---|---|---|---|---|
| 3,897,961 | A * | 8/1975 | Leising | B60R 21/214 280/730.1 |
| 3,953,049 | A * | 4/1976 | Surace | B60R 21/08 280/730.1 |
| 5,125,682 | A * | 6/1992 | Hensler | B60R 21/215 280/730.1 |
| 5,282,648 | A * | 2/1994 | Peterson | B60R 21/18 244/122 B |
| 5,480,181 | A * | 1/1996 | Bark | B60R 21/08 280/729 |
| 5,839,139 | A * | 11/1998 | Fink | A61G 7/0755 5/648 |
| 6,017,059 | A * | 1/2000 | Taubenberger | B60R 21/23184 280/730.1 |
| 6,286,860 | B1 * | 9/2001 | Adomeit | B60R 21/18 280/730.1 |
| 6,375,217 | B2 * | 4/2002 | Fischer | B60R 21/232 280/728.2 |
| 6,417,764 | B2 * | 7/2002 | Tonkin | B60Q 1/444 180/282 |
| 6,722,691 | B1 * | 4/2004 | H.ang.land | B60R 21/16 280/730.1 |
| 7,025,376 | B2 * | 4/2006 | Dominissini | B60R 21/233 280/729 |
| 7,188,862 | B2 * | 3/2007 | Webber | B60R 21/2338 280/729 |
| 7,331,597 | B2 * | 2/2008 | Williams | B60R 21/232 280/728.2 |
| 7,357,212 | B2 * | 4/2008 | Sasaki | B60R 21/36 180/274 |
| 7,360,790 | B2 * | 4/2008 | Hasebe | B60R 21/233 280/743.2 |
| 7,404,575 | B2 * | 7/2008 | Bito | B60R 21/205 280/743.1 |
| 7,614,648 | B2 * | 11/2009 | Heudorfer | B60R 21/231 280/729 |
| 7,631,895 | B2 * | 12/2009 | Kalliske | B60R 21/233 280/743.2 |
| 7,766,382 | B2 * | 8/2010 | Murakami | B60R 21/18 280/733 |
| 7,862,073 | B2 * | 1/2011 | Thomas | B60R 21/231 280/729 |
| 8,328,228 | B2 * | 12/2012 | Lee | B60R 21/214 280/729 |
| 8,403,362 | B2 * | 3/2013 | Baumann | B60R 21/231 280/729 |
| 8,414,017 | B2 * | 4/2013 | Lee | B60R 21/231 280/730.1 |
| 8,789,846 | B2 * | 7/2014 | Wipasuramonton | B60R 21/232 280/730.2 |
| 8,807,593 | B2 * | 8/2014 | Lee | B60R 21/213 280/730.1 |
| 8,998,252 | B2 * | 4/2015 | Hirth | B60R 21/231 280/729 |
| 2004/0164526 | A1 * | 8/2004 | Hasebe | B60R 21/233 280/729 |
| 2004/0183286 | A1 | 9/2004 | Kino | |
| 2004/0195807 | A1 * | 10/2004 | Hasebe | B60R 21/233 280/728.1 |
| 2012/0048442 | A1 * | 3/2012 | Kyle | B60C 17/02 152/518 |
| 2012/0080869 | A1 * | 4/2012 | Lee | B60R 21/214 280/729 |
| 2013/0088056 | A1 * | 4/2013 | Quatanens | B60R 21/233 297/216.13 |
| 2013/0234422 | A1 | 9/2013 | Wipasuramonton et al. | |
| 2016/0288747 | A1 * | 10/2016 | Jensen | B60R 19/00 |

FOREIGN PATENT DOCUMENTS

| | | |
|---|---|---|
| DE | 10 2012 005 790 A1 | 9/2013 |
| EP | 0 757 634 B1 | 12/1998 |
| FR | 2 825 052 | 11/2002 |
| JP | 2004-243887 A | 9/2004 |
| JP | 2006-130983 A | 5/2006 |
| JP | 2007-504047 A | 3/2007 |
| JP | 2008-195261 A | 8/2008 |
| WO | WO 2005/025946 A2 | 3/2005 |
| WO | WO 2012/108694 A1 | 8/2012 |
| WO | WO 2013/139415 A1 | 9/2013 |

OTHER PUBLICATIONS

Chinese Office Action dated Feb. 28, 2017—CN 201580002025.8—with trans.
German Examination Report—dated Jun. 23, 2016.
European Search Report—dated Jul. 9, 2014.
German Examination Report—dated Jul. 9, 2014.
PCT International Search Report—dated Mar. 19, 2015.

* cited by examiner

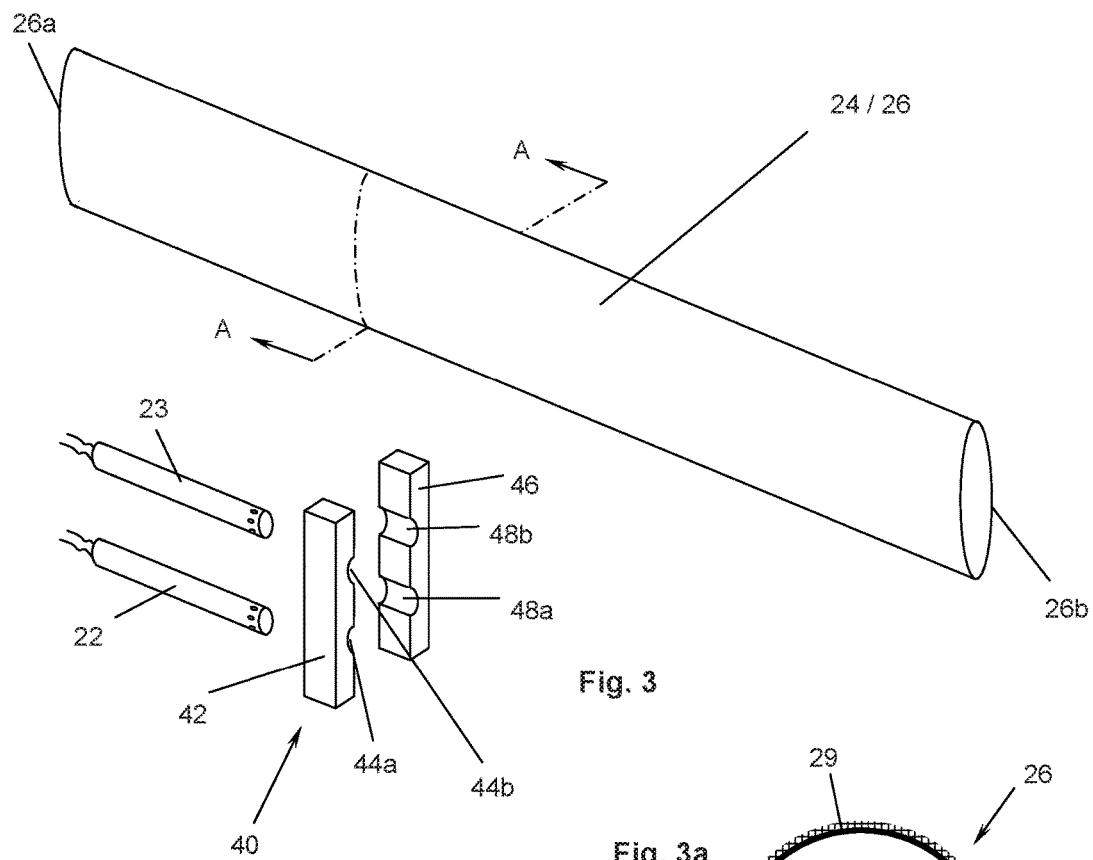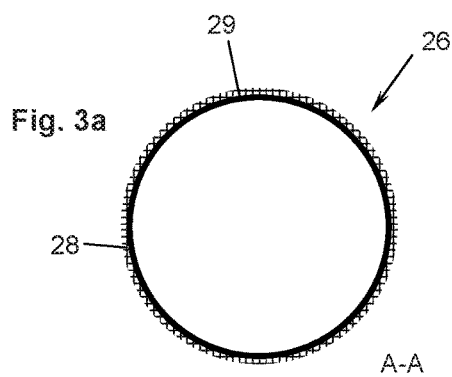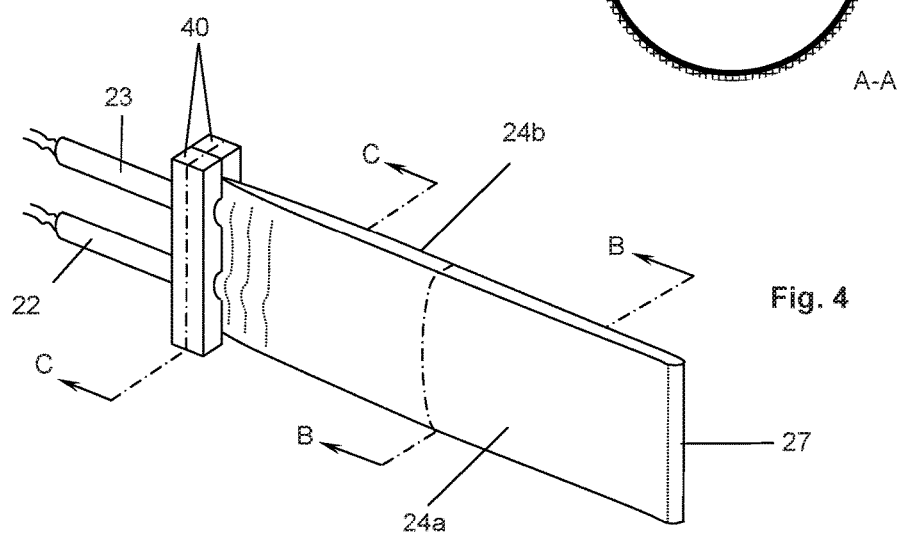

AIRBAG UNIT AND MOTOR VEHICLE

CROSS REFERENCE TO RELATED APPLICATIONS

This application claims priority to European Patent Application No. 14 000 435.9, filed Feb. 6, 2014 and PCT International Application No. PCT/EP2015/000212, filed on Feb. 3, 2015.

FIELD OF THE INVENTION

The invention concerns an airbag unit for a motor vehicle.

BACKGROUND

The use of airbag units is widespread in today's automotive technology. An airbag unit has at least one airbag enclosing at least one chamber and at least one inflator, in most cases in form of a gas generator for filling the chamber such that the airbag deploys.

Currently most airbag units are used for protecting an occupant (driver or passenger) sitting inside the passenger compartment of a motor vehicle. This means that the airbag of such an airbag unit deploys into the passenger compartment in order to restrain the occupant. Consequently the airbag of such an airbag unit must be relatively soft and the airbag usually has to include a ventilation opening for releasing inflation gas, such that kinetic energy can be dissipated.

Recently so called pedestrian airbags serving for the protection of a pedestrian involved in an accident have been introduced. Such pedestrian airbags usually cover at least a part of the windshield and/or a part of at least one A-pillar on the outside of the vehicle in order to prevent the pedestrian's head from hitting the windscreen or A-pillar. Such pedestrian airbags usually also need to be relatively soft in order to give the desired protection.

From EP 0 757 634 B1 it is known to place the airbag of an airbag unit between an element outside the passenger compartment and the passenger compartment in order to prevent that element from intruding into the passenger compartment in case of an accident. This element can for example be a wheel the engine block or another component. This measure can especially be useful for small and light-weight motor vehicles.

It is an object of the present invention to provide an improved airbag unit, especially for the use described in the generic EP 0 757 634 B1.

It is a further object of the invention to provide a motor vehicle with such an improved airbag unit.

An airbag that is used to prevent an element (for example a wheel) from intruding into a passenger compartment needs to possess several characteristics. First, it needs to be very sturdy, since high forces can be applied to it during the accident and because the airbag needs to be filled with a high pressure (for example 10 bars) in order to prevent the element from intruding into the passenger compartment. Typical airbags as described above are very likely to burst under such conditions. Second, such an airbag should not have a ventilation opening.

In order to comply with these requirements, the airbag of the airbag unit in accordance with this invention is made of a hose extending from a first end to a second end, wherein this hose is preferably in the form of a one-pieced woven hose element. This one-pieced woven hose element can be generally of the type as is used for fire hoses. Due to the one-piece woven structure such a hose element can withstand very high internal pressure forces.

Often, a relatively large thickness will be desired. In order to provide such a large thickness, it would in principle be possible to use a hose with a large diameter, but this would have several drawbacks. One of those is, that a doubling of the thickness (this means the doubling of the diameter of the hose) would lead to quadruplication of the volume to be filled by the inflator. So, according to the present invention, an airbag with two parallel sections is provided. These two sections are generated by folding the hose such that it is divided into the two sections with each section enclosing a chamber.

In order to retain the gas-tightness and robustness it is usually preferred to provide a separate gas feeding for each chamber. This makes it possible to fill both chambers through the ends (face-sides) of the hose, such that no additional holes in the lateral area of the hose that could weaken the airbag are necessary.

In order to get a simple, sturdy and compact design, it can further be preferred to provide a separate inflator for each chamber.

It is further preferred to provide a joint clamp for the two end areas of the hose. The two inflators or two tubes for filling the chambers can extend through the clamp, leading to a very compact design with a minimum of parts.

In order to improve the gas-tightness of the airbag, it can be preferred that the one-pieced-woven hose element is coated, especially on its inside. Silicone can be used for the coating.

As has already been mentioned, the airbag of the airbag unit according to the invention is especially useful for preventing an element of a motor vehicle which is located outside the passenger compartment from intruding into the passenger compartment during an accident. This element can especially be a wheel, and engine block, a battery, a part of the transmission of the vehicle or another component.

In the case that the element to be restrained is a wheel, the airbag will be located inside a wheel housing in most applications, but the invention can also be applied to motor vehicles that does not have a wheel housing, which can be the case especially with ultra-light electric cars.

Another application of the inventive airbag unit can be the use of the airbag as a seat lifter. Seat lifters can be used to help to restrain the pelvis of a passenger.

BRIEF DESCRIPTION OF THE DRAWINGS

The invention will now be described in detail in view of preferred embodiments with reference to the figures. The figures show:

FIG. 3 illustrates components of a preferred embodiment of an airbag unit used in the motor vehicle shown in FIG. 1, FIG. 3a is a cross-sectional view of the airbag of FIG. 3 along plane A-A, FIG. 4 shows the airbag unit of FIG. 3 in its assembled state.

DETAILED DESCRIPTION

Figure 1:
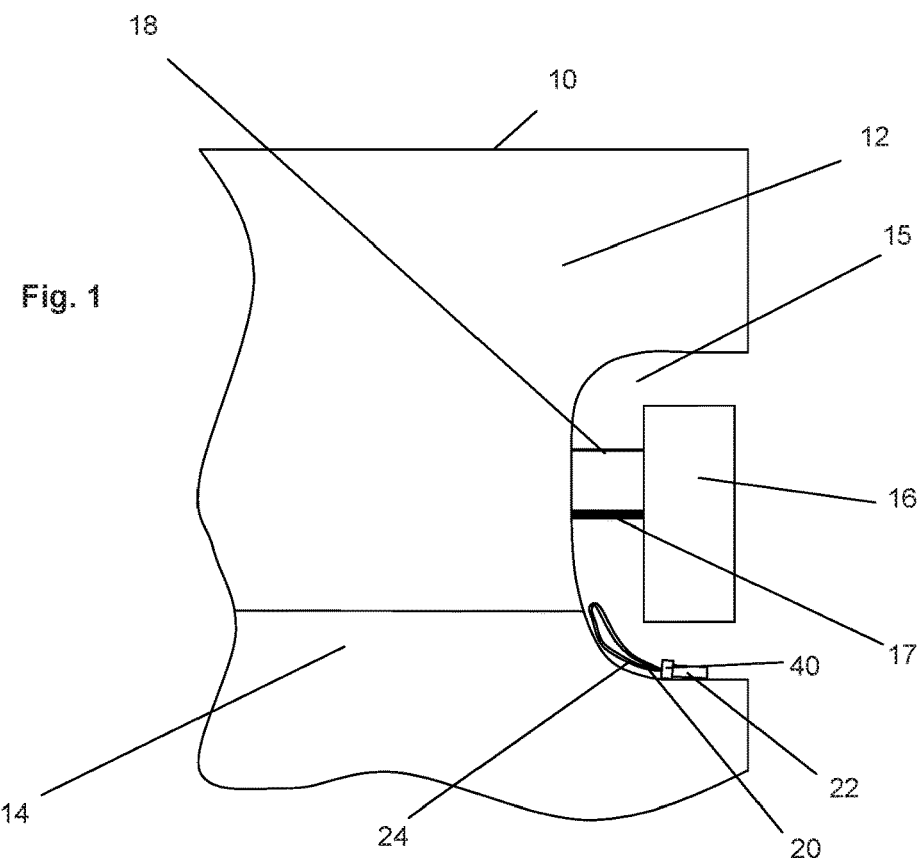
FIG. 1 is a schematic representation of a front part of a motor vehicle, especially of a small passenger car.

FIG. 1 shows the right front of a motor vehicle, especially of a small passenger car in a schematic representation. The car body 10 encloses a motor compartment 12 and a passenger compartment 14. A wheel housing (wheel house) 15 is adjacent to both, the motor compartment 12 and the passenger compartment 14. A wheel 16 is located inside the wheel housing 15 with an axle 17 and a steering linkage 18 extending from the wheel 16.

In order to prevent the wheel 16 from intruding into the passenger compartment 14 in case of a front or a side collision, an airbag unit 20 is provided with the airbag 24 of the airbag unit being placed between the wheel 16 and the passenger compartment 14. As will be described later with reference to FIGS. 3 to 6, the airbag 24 includes two sections 24a, 24b with each section enclosing a chamber. Each of these chambers is in gas flow connection with an inflator, namely a gas generator 22 and 23. One of these gas generators, namely the first gas generator 22 is shown in FIGS. 1 and 2.

Figure 2:
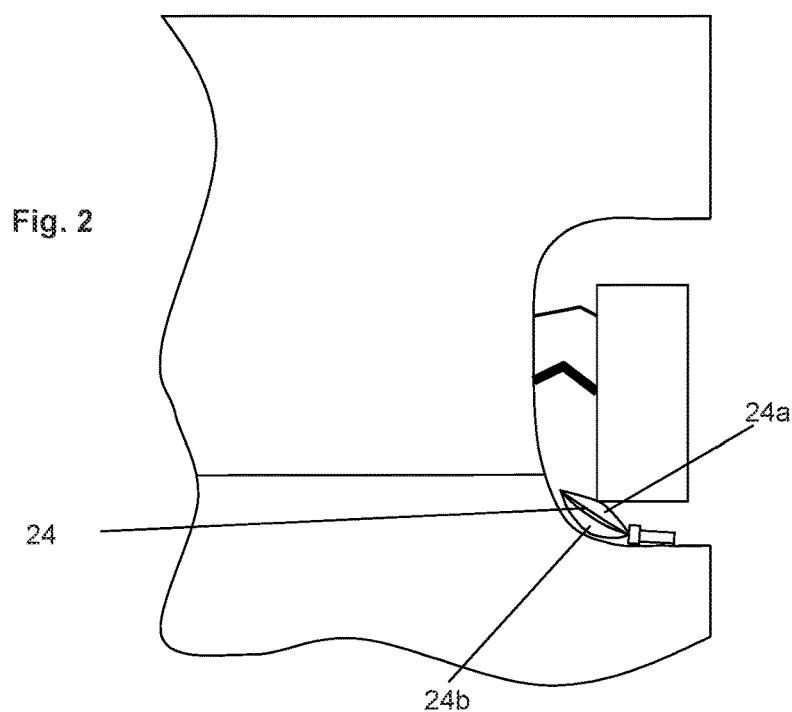
FIG. 2 shows what is shown in FIG. 1 after a side collision.
Figures 4A, 4B:
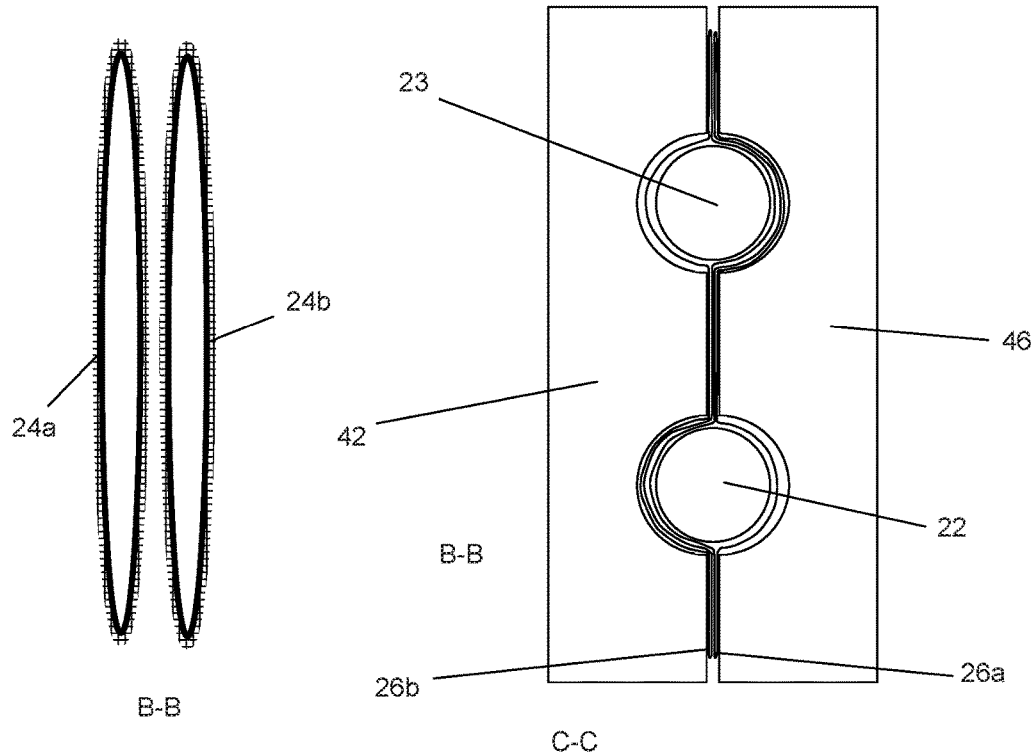
FIG. 4a is a cross-sectional view along plane B-B of FIG. 4.
FIG. 4b is a cross-sectional view along plane C-C of FIG. 4.
Figure 5:
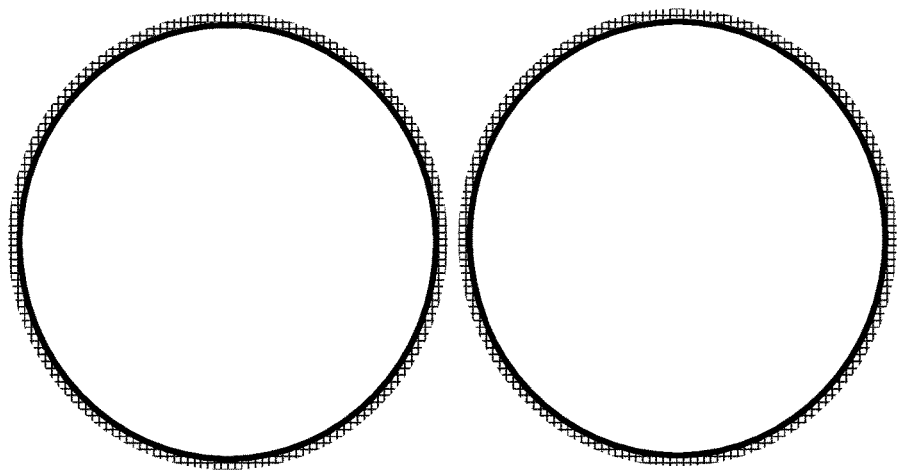
FIG. 5 shows the components shown in FIG. 4a in the deployed state of the airbag.

If a critical accident occurs, the gas generators are triggered and fill the chambers formed by sections 24a and 24b of the airbag 24 with gas, such that the airbag 24 protects the passenger compartment 14, as is schematically shown in FIG. 2. As has already been mentioned, this basic concept is known from generic EP 0 757 634 B1, but this concept can only work successfully if an airbag unit is provided whose airbag is very sturdy and that can be filled with gas of high pressure, for example ten bars or more.

A preferred embodiment of a suitable airbag unit is now described with reference to FIGS. 3, 3a, 4, 4a, 4b and 5. This airbag unit is basically is formed by only principal elements, namely an airbag 24 in form of a hose 26 extending from a first end 26a to a second end 26b, a joint clamp 40 being formed of a first element 42 and the second element 46, and two gas generators 22 and 23 serving as inflators.

The hose 26 is formed of a hose element 28 which is preferably one-pieced woven, as it is for example known from fire hoses. As is shown in FIG. 3a, the one-pieced woven hose element 28 can be coated with a coating 29, preferably on the inside, in order to improve the gas tightness. This coating can for example be a silicone material. The hose element 28 extends over the complete length of the hose 26.

The joint clamp 40 has a first element 42 and a second element 46. The two elements can be separate elements in the unassembled state or they can be connected to one another, for example by a hinge. In the embodiment shown, the joint clamp 40 consists of separate elements which can be connected by screws (not shown) or similar elements. The two elements 42 and 46 of the joint clamp 40 both form two grooves 44a, 44b, 48a, and 48b, one for each gas generator 22 and 23. The grooves have a semi-circular cross section. The joint clamp 40 can be made of metal or plastic, for example a fibre-reinforced plastic.

An assembly process is as follows. First, the hose 24 is folded or bent in the middle between the two ends 26a, 26b of the hose, such that the two ends 26a, 26b of the hose are placed next to each other and a fold 27 is formed which creates two separate chambers formed by sections 24a and 24b separated by the fold which prevents or restricts gas flow between the chambers due to the closed internal passageway at the fold. Then, the first gas generator 22 is inserted through the first end 26a of the hose 26 and the second gas generator 23 is inserted through the second end of the hose 26b (or vice versa), such that each gas generator is in fluid communication with one chamber. Finally, the joint clamp is applied to the end areas of the hose such that the gas generators 22 and 23 are gas-tightly connected to their respective end area of the airbag 24 formed by the hose 26. So, a two-chambered airbag is created by very simple means. If it is not desired to insert the gas generators 22 and 23 themselves into the chambers formed by sections 24a and 24b of the airbag, it would also be possible to connect each gas generator 22 and 23 via a tube with the chamber of the airbag in a similar way, namely such that the joint clamp 40 forms openings through which the tubes extend. In the case that tubes are used, it would also be possible to use only one gas generator and split its gas stream via a (for example T- or Y-shaped) divider into two gas streams (one for each tube).

The described connection of the gas generators with the chambers (directly or via a tube) is preferred since by this it is not necessary to penetrate through the lateral surface of a hose 26 which might lead to a local weakening of the hose.

When the gas generators 22 and 23 are triggered, both chambers are filled with gas such that the two sections 24a and 24b of the airbag 24 expand. Due to the high pressure (preferable 10 bar or more), there is no or only very little gas exchange between the two chambers through the fold 27.

In priniciple it would also be possible to provide a separate clamp for each end of the hose 26, but since in most applications this would lead to an increased weight, this is in most cases not preferred.

The described airbag unit with the two-chamber-airbag has several advantages. First, the thickness of the deployed airbag is doubled. Second, only one joint clamp is needed. And finally, the end of the airbag remote from the joint clamp can be free of any heavy parts such as a clamp. This makes the mounting easy and it is prevented that a heavy part hits other parts of the vehicle when the airbag deploys. When the described airbag module is mounted, it is preferred that the joint clamp and/or the gas generators are permanently (often also rigidly) connected to the car body. In many applications it will also be necessary to connect the end of the airbag remote from the joint clamp with the car body, but, since the airbag (the hose) will shorten when filled with gas, it is preferred that the connection of this remote end with the car body is such that it can be deformed or destroyed when the airbag deploys. For example, this connection can be in the form of a breakable plastic part.

Of course it is possible that to each wheel of the motor vehicle, especially to each front wheel, an airbag unit as described herein is allocated.

As has already been mentioned, the inventive airbag unit can be used for other purposes, for example for preventing an element being located inside the motor compartment from intruding into the passenger compartment. Even applications inside the passenger compartment are possible, for example the use as a seat-lifter.

While the above description constitutes the preferred embodiment of the present invention, it will be appreciated that the invention is susceptible to modification, variation and change without departing from the proper scope and fair meaning of the accompanying claims.

The invention claimed is:

1. A motor vehicle comprising;
   a car body,
   a passenger compartment inside the car body, at least one airbag unit comprising an airbag and at least one inflator, the airbag of the at least one airbag unit is located outside the passenger compartment, at least one wheel outside the passenger compartment, wherein the airbag of the at least one airbag unit is located between the at least one wheel and the car body, wherein the airbag is made of a hose extending from a first end to a second end, the hose comprising a one-pieced woven hose element extending from the first end to the second end, and the hose being bent or folded to form a fold and two parallel first and second chambers of the airbag, the first end being juxtaposed with the second end, the hose being bent or folded at an intermediate portion between the first end and the second end, a separate gas-feeding path being provided for each of the first and the second chambers, such that gas can be introduced through the first end into the first chamber by one of the gas-feeding paths, and through the second end into the second chamber by the other gas-feeding path.

2. The airbag unit according to claim 1, wherein a separate inflator is provided for each of the first and the second chambers.

3. The airbag unit according to claim 1, further comprising in that the at least one inflator or a tube being connected to the at least one inflator extends through a face-side opening of the hose.

4. The airbag unit according to claim 1 further comprising the hose in areas adjacent to the first and the second ends are held by a joint clamp.

5. The airbag unit according to one of claim 4, further comprising the at least one inflator in the form of a first and a second inflator and the first and the second inflators communicate to the hose first and the second sections by a first and a second tube which extend through the joint clamp.

6. The airbag unit according to claim 4, further comprising the at least one inflator in the form of a first and a second inflator and wherein the joint clamp comprises a first element and a second element, each of the first and second elements having a first groove and a second groove, wherein the first groove of the first element and the first groove of the second element form a first through-hole for the first inflator or for the first tube, and wherein the second groove of the first element and the second groove of the second element form a second through-hole for the second inflator or for the second tube.

7. The airbag unit according to claim 1 wherein the one-pieced woven hose element is coated.

8. A motor vehicle according to claim 1, further comprising in that the airbag is located inside a wheel housing.

9. A motor vehicle according to claim 1, further comprising that the airbag of the at least one airbag unit is placed between an engine block, a battery, or a part of the transmission of the vehicle, and the passenger compartment.

10. An airbag unit according to claim 1 further comprising the fold forms a boundary of the first and the second hose sections.

11. An airbag unit according to claim 1 further comprising the fold restricts the flow of gas from the at least one inflator between the first and the second hose sections.

12. A motor vehicle according to claim 1 further comprising the fold forms a boundary of the first and the second hose sections.

13. A motor vehicle according to claim 1 further comprising the fold restricts the flow of gas from the at least one inflator between the first and the second hose sections.

* * * * *